United States Patent [19]

Funakoshi et al.

[11] 4,410,655
[45] Oct. 18, 1983

[54] AQUEOUS DISPERSION OF ETHYLENE/α,β-UNSATURATED CARBOXYLIC ACID COPOLYMER BLEND

[75] Inventors: Katsumi Funakoshi, Iwakuni; Hideyuki Itoi, Yamaguchi; Toshifumi Konishi, Iwakuni, all of Japan

[73] Assignee: Mitsui Petrochemical Industries, Ltd., Tokyo, Japan

[21] Appl. No.: 270,878

[22] Filed: Jun. 5, 1981

Related U.S. Application Data

[63] Continuation of Ser. No. 112,087, Jan. 14, 1980, abandoned.

[30] Foreign Application Priority Data

Jan. 17, 1979 [JP] Japan .................................. 54/2879

[51] Int. Cl.$^3$ ....................... C08L 35/00; C08L 33/02
[52] U.S. Cl. ........................... 524/522; 260/DIG. 31; 428/411; 428/461
[58] Field of Search ......................................... 524/522

[56] References Cited

U.S. PATENT DOCUMENTS

| | | | |
|---|---|---|---|
| 3,392,131 | 7/1968 | Miles | 525/221 |
| 3,649,578 | 3/1972 | Bush | 525/221 |
| 3,970,626 | 7/1976 | Hurst | 525/221 |
| 4,136,069 | 1/1979 | Vachon | 525/221 |

*Primary Examiner*—C. A. Henderson, Jr.
*Attorney, Agent, or Firm*—Sherman & Shalloway

[57] ABSTRACT

An aqueous dispersion of improved stability, said dispersion consisting essentially of a mixture of (A) 10 to 90% by weight of an ethylene/α,β-unsaturated carboxylic acid copolymer containing 12 to 20% by weight on an average of α,β-unsaturated carboxylic acid units or the metal salt thereof, and (B) 90 to 10% by weight of an ethylene/α,β-unsaturated carboxylic acid copolymer containing 5 to 12% by weight on an average of α,β-unsaturated carboxylic acid units or the metal salt thereof, said mixture containing 8 to 20% by weight on an average, based on the weight of the mixture, of the α,β-unsaturated carboxylic acid units, 30 to 80% of which units are present in the form of metal salts, and said mixture not containing more than 5% by weight, based on the weight of the mixture, of a fraction of the ethylene/α,β-unsaturated carboxylic acid having an α,β-unsaturated carboxylic acid unit content of less than 5% by weight or its salt, and more than 10% by weight, based on the weight of the mixture, of a fraction of the ethylene/α,β-unsaturated carboxylic acid having an α,β-unsaturated carboxylic acid unit content of more than 20% by weight or its salt.

1 Claim, No Drawings

AQUEOUS DISPERSION OF ETHYLENE/α,β-UNSATURATED CARBOXYLIC ACID COPOLYMER BLEND

This is a continuation of application Ser. No. 112,087, filed Jan. 14, 1980, now abandoned.

BACKGROUND OF THE INVENTION

This invention relates to an aqueous dispersion of an ionically crosslinked ethylene/α,β-unsaturated carboxylic acid copolymer. More specifically, it relates to an aqueous dispersion having much improved stability and viscosity comprising a mixture of two ethylene/α,β-unsaturated carboxylic acid copolymers or the metal salts thereof having different average contents of α,β-unsaturated carboxylic acid units.

An ionically crosslinked ethylene/α,β-unsaturated carboxylic acid copolymer is attracting attention as a coating material because of its excellent adhesion to various substrates. In coating, it is sometimes used in the form of an aqueous dispersion, and in this case, the aqueous dispersion must meet the following requirements.

(i) From the standpoint of coatability, the aqueous dispersion should have a moderate range of viscosity.

(ii) To obtain a necessary and sufficient coating thickness, the polymer concentration of the aqueous dispersion should be maintained above a certain point.

It is generally not easy to produce an aqueous dispersion of the ionically crosslinked ethylene/α,β-unsaturated carboxylic acid copolymer which simultaneously meets these two requirements (i) and (ii). For example, attempts to obtain a stable aqueous dispersion having a high polymer concentration result in a very high viscosity that leads to poor coatability. Or if it is attempted to obtain an aqueous dispersion having a high copolymer concentration and a moderate viscosity, the stability of the resulting dispersion is poor and tends to separate into two layers. Because of these difficulties, no satisfactory aqueous dispersion of the ionically crosslinked ethylene/α,β-unsaturated carboxylic acid copolymer has been discovered to date.

It has also been found that the particle diameters of the polymer particles and the distribution of the particle diameters vary with the content of the α,β-unsaturated carboxylic acid unit in the aqueous dispersion of the ionically crosslinked ethylene/α,β-unsaturated carboxylic acid copolymer, and the smoothness of the resulting coated film is extremely affected by the state of the particles, and that the water resistance of the coated film is directly changed by the content of the α,β-unsaturated carboxylic acid unit.

Recently, Japanese Laid-Open Patent Publication No. 148534/77 suggested a coating aqueous dispersion of an ethylenic copolymer, said ethylenic copolymer being composed of 99 to 75 mole% of ethylene and 1 to 25 mole% of an α,β-ethylenically unsaturated carboxylic acid, wherein the distribution of the α,β-ethylenically unsaturated carboxylic acid group in the copolymer is characterized by the fact that the ratio of the reciprocal of the minus primary moment of distribution to the plus primary moment of distribution is from 0.50 to 0.95, and wherein at least 10% of the α,β-ethylenically unsaturated carboxylic acid is neutralized with a metal ion and/or an ammonium ion. Certainly, the film-formability of this aqueous dispersion is improved to some extent. But when a surfactant is not used, it is impossible to form an aqueous dispersion having superior stability.

SUMMARY OF THE INVENTION

It is a primary object of this invention to provide an aqueous dispersion of an ethylene/α,β-unsaturated carboxylic acid copolymer having superior dispersion stability.

Another object of this invention is to provide an aqueous solution of an ethylene/α,β-unsaturated carboxylic acid copolymer useful for coating, which has superior stability and a moderate viscosity even in the absence of a surfactant, and can give a coated film having good smoothness and low water absorption.

Other objects and advantages of this invention will become apparent from the following description.

DETAILED DESCRIPTION OF THE INVENTION

According to this invention, there is provided an aqueous dispersion of improved stability, said dispersion consisting essentially of a mixture of (A) 10 to 90% by weight of an ethylene/α,β-unsaturated carboxylic acid copolymer containing 12 to 20% by weight on an average of α,β-unsaturated carboxylic acid units or the metal salt thereof, and (B) 90 to 10% by weight of an ethylene/α,β-unsaturated carboxylic acid copolymer containing 5 to 12% by weight on an average of α,β-unsaturated carboxylic acid units or the metal salt thereof, said mixture containing 8 to 20% by weight on an average, based on the weight of the mixture, of the α,β-unsaturated carboxylic acid units, 30 to 80% of which units are present in the form of metal salts, and said mixture not containing more than 5% by weight, based on the weight of the mixture, of a fraction of the ethylene/α,β-unsaturated carboxylic acid having an α,β-unsaturated carboxylic acid unit content of less than 5% by weight or its salt, and more than 10% by weight, based on the weight of the mixture, of a fraction of the ethylene/α,β-unsaturated carboxylic acid having an α,β-unsaturated carboxylic acid unit content of more than 20% by weight or its salt.

The ethylene/α,β-unsaturated carboxylic acid copolymers or the metal salts thereof used as components (A) and (B), when taken individually, are known copolymers, and may therefore be selected from known copolymers. The ethylene/α,β-unsaturated carboxylic acid copolymer may preferably consist solely of an ethylene unit and at least one α,β-unsaturated carboxylic acid unit. If desired, how however, it may include a small amount, generally up to 20% by weight, preferably up to 15% by weight, of a third monomeric unit. Examples of the third monomer include α-olefins such as propylene and butene-1, alkyl esters of α,β-unsaturated carboxylic acids such as methyl acrylate, ethyl acrylate, butyl acrylate, octyl acrylate, methyl methacrylate and butyl methacrylate, vinyl esters such as vinyl acetate, and other vinyl monomers such as vinyl chloride, styrene and vinyl alcohol.

The aforesaid copolymer may be prepared by methods known per se. For example, it may be prepared by polymerizing ethylene and at least one α,β-unsaturated carboxylic acid and optionally a third monomer under high pressures in the presence of oxygen or a radical copolymerization catalyst; or by performing the above polymerization using an ester of the α,β-unsaturated carboxylic acid instead of the free α,β-unsaturated carboxylic acid and saponifying the resulting copolymer.

Suitable α,β-unsaturated carboxylic acids for copolymerization with ethylene are α,β-unsaturated aliphatic mono- or di-carboxylic acids having 3 to 8, preferably 3 to 5 carbon atoms. Examples include acrylic acid, methacrylic acid, α-ethylmethacrylic acid, maleic acid, fumaric acid, and itaconic acid. Acrylic acid and methacrylic acid are especially preferred.

Thus, examples of the ethylene/α,β-unsaturated carboxylic acid copolymers suitably used as components (A) and (B) in this invention include an ethylene/acrylic acid copolymer, an ethyrene/methacrylic acid copolymer, an ethylene/acrylic acid/methacrylic acid terpolymer, and an ethylene/methacrylic acid/isobutyl acrylate terpolymer.

The metal salts of these copolymers can also be used in this invention. Usable metal salts are those which dissociate as a metal ion when dispersed in an aqueous medium. Typical metal salts include alkali metal salts such as sodium, potassium and lithium salts, alkaline earth metal salts such as magnesium and calcium salts, and zinc salts. The sodium, potassium, lithium, magnesium and zinc salts are especially preferred. If desired, a part of the metal salt may be replaced by an ammonium salt or an organic amine salt.

The characteristic feature of the present invention resides in the use of a mixture of two ethylene/α,β-unsaturated carboxylic acid copolymers or the salts thereof having different average contents of α/β-unsaturated carboxylic acid units as a polymer to be dispersed.

As component (A), an ethylene/α,β-unsaturated carboxylic acid copolymer or its salt containing 12 to 20% by weight, preferably 12 to 18% by weight, on an average of α,β-unsaturated carboxylic acid units is used. When the metal salt of the copolymer is used, it is not necessary that all of the α,β-unsaturated carboxylic acid units are in the form of metal salts. Desirably at least 30%, preferably 40 to 80%, of the total α,β-unsaturated carboxylic acid units present are in the form of metal salt. Desirably, the ethylene/α,β-unsaturated carboxylic acid copolymer or its metal salt has a melt index (ASTM D-1238-57T, unit: g/10 min.; the same throughout the specification) of generally 0.2 to 150, preferably 0.5 to 100.

The "average content", as used with respect to the α,β-unsaturated carboxylic acid unit in the present specification and the appended claims, is the value measured by infrared absorption spectroscopy of a film made by pressforming the ethylene/α,β-unsaturated carboxylic acid copolymer or its metal salt. Specifically, the average content of the α,β-unsaturated carboxylic acid unit is determined from the height of the peak (1550 cm$^{-1}$) of an absorption attributed to a carboxyl ion and the absorption peak (1708 cm$^{-1}$) corresponding to carboxylic acid in an infrared absorption spectrum, using a known calibration curve.

The term "α,β-unsaturated carboxylic acid unit" is used to mean not only an α,β-unsaturated carboxylic acid unit in which the carboxyl group is free, but also an α,β-unsaturated carboxylic acid unit in which the carboxyl group is in the form of a metal salt.

As component (B), an ethylene/α,β-unsaturated carboxylic acid copolymer containing 5 to 12% by weight, preferably 5 to 11% by weight, on an average of an α,β-unsaturated carboxylic acid unit or its metal salt is used. When the metal salt of the copolymer is used as component (B), it is not necessary that all of the α,β-unsaturated carboxylic acid units are in the form of metal salt. Rather, it is desirable that only some of them are present in the form of salt and the remainder, in the form of free acid. It is generally advantageous that at least 60%, preferably 30 to 50%, of the total α,β-unsaturated carboxylic acid units are present in the form of metal salts. The ethylene/α,β-unsaturated carboxylic acid copolymer or its metal salt used as component (B) desirably has a melt index of generally 0.2 to 150, preferably 0.5 to 100.

In the present invention, the mixing ratio between the components (A) and (B) is also a critical factor. Based on the total weight of the mixture, component (A) is used in a proportion of 10 to 90% by weight, and component (B), in a proportion of 90 to 10% by weight. Preferably, component (A) is used in a proportion of 30 to 70% by weight, and component (B) in a proportion of 70 to 30% by weight. Advantageously, component (A) is used in a proportion of 30 to 50% by weight, and component (B), in a proportion of 50 to 70% by weight.

It is important that the mixing of the components (A) and (B) is performed such that the average content of the α,β-unsaturated carboxylic acid units in the resulting mixture is within the range of 8 to 20% by weight, preferably 10 to 17% by weight, based on the weight of the mixture. When the average content in the mixture is less than 8% by weight, the resulting aqueous dispersion generally consists of irregularly-shaped polymer particles having a size of 50 microns or more, and its stability is very poor. Conversely, if the average content exceeds 20% by weight, the particle diameter of the polymer particles decreases, and the viscosity of the aqueous solution markedly increases when the polymer concentration is high, for example more than 35% by weight.

It is important further that a part of the α,β-unsaturated carboxylic acid units present in the mixture of components (A) and (B) should be present in the form of metal salts. Specifically, 30 to 80%, preferably 40 to 70%, of the α,β-unsaturated carboxylic acid units in the mixture should be present in the form of metal salts. If mere mixing of the components (A) and (B) does not provide the above range of the proportion of the α,β-unsaturated carboxylic acid metal salt units in the mixture, it may be adjusted by a known method, for example by neutralizing the mixture with an aqueous alkaline solution containing a metal ion capable of forming the desired metal salt.

It is further important that the mixing of components (A) and (B) should be performed such that the distribution of the α,β-unsaturated carboxylic acid units in the resulting mixture is within a specified range. Specifically, it is important that the mixture of comnents (A) and (B) should not contain (i) more than 5% by weight, preferably more than 4% by weight, based on the weight of the mixture, of a fraction of the ethylene/α,β-unsaturated carboxylic acid copolymer having an α,β-unsaturated carboxylic acid unit content of less than 5% by weight or its salt (to be referred to as fraction X), and (ii) more than 10% by weight, more than 8% by weight, based on the weight of the mixture, of a fraction of the ethylene/α,β-unsaturated carboxylic acid copolymer having an α,β-unsaturated carboxylic acid unit content of more than 20% by weight or its salt (to be referred to as fraction Y).

If an aqueous dispersion is prepared from the mixture containing more than 5% by weight of fraction X, the particle diameter of the polymer particles increases and the percentage of large particles increases to broaden the particle size distribution. As a result, a coated film prepared from the aqueous dispersion has an uneven surface. On the other hand, if an aqueous dispersion is prepared from the mixture containing more than 10% by weight of fraction Y, a coated film prepared from the aqueous dispersion has an extremely increased rate of water absorption, and its water resistance is poor.

Fractionation of the fractions X and Y is performed by treating the mixture of components (A) and (B) with methanol-sulfuric acid to form a methyl ester, and further subjecting it to the column elution method disclosed in U.S. Pat. No. 3,350,372.

An aqueous dispersion of the mixture of components (A) and (B) may be prepared by known dispersing methods, for example those described in British Pat. No. 1,517,828 and U.S. Pat. No. 3,677,989. For example, the aqueous dispersion of this invention can be formed by introducing the components (A) and (B) in the aforesaid proportions either in the molten state or in the non-molten state into an aqueous medium, preferably water or an aqueous alkali solution such as an aqueous solution of sodium hydroxide or potassium hydroxide, and vigorously stirring the mixture at a temperature above the melting point of the component (A) or (B) whichever is higher, optionally under pressure so as to maintain the aqueous medium liquid.

If an aqueous dispersion is prepared from only the component (A), the viscosity of the dispersion increases abruptly at a polymer concentration above a certain limit. By using the component (B) together in a specified proportion according to this invention, the viscosity of the dispersion can be reduced even at the same polymer concentration. An attempt to prepare an aqueous dispersion from only the component (B) would not provide good dispersion stability.

According to this invention, an aqueous dispersion of a low viscosity having a polymer solids concentration exceeding 30% by weight can be easily obtained. Generally, the aqueous dispersion of this invention may have a solids concentration of 10 to 50% by weight, preferably 20 to 40% by weight. The polymer particles dispersed in the aqueous dispersion are very fine with a particle size generally in the range of about 0.01 to about 1 micron, and the particle size distribution is narrow and the distribution curve is sharp. Accordingly, a coated film prepared from the aqueous dispersion of this invention is very smooth.

While many of the conventional aqueous dispersions of an ethylene/α,β-unsaturated carboxylic acid copolymer contain a surface-active agent as a dispersing agent, it is advantageous that the aqueous dispersion of this invention has very good dispersion stability in the absence of a surfactant, and for example, even after storage for 6 months, no change is noted in the state of dispersion. Thus, the present invention provides a surfactant-free aqueous dispersion.

The aqueous dispersion of this invention is very suitable for coating because its viscosity can be maintained at a relatively low value even when its solids concentration is high. The aqueous dispersion of this invention generally have a viscosity of not more than 4,000 centipoises, usually not more than 2000 centipoises although it varies depending upon the solids concentration. The viscosity of the aqueous dispersion is measured by a rotor No. 1, 2 or 3 at a rotating speed of 6 rpm using a Brookfield type viscometer.

The aqueous dispersion provided by the present invention can be utilized for coating various substrates such as paper, paperboards, wooden plates, metals, plastics, ceramics, and glass. The coated articles are used as such. If required, by utilizing the superior adhesiveness or heat sealability of the coated surfaces of these articles, they may be further bonded or laminated to themselves or to other materials (e.g., metals, resins, rubbers).

When the aqueous dispersion is to be used as a paint, an adhesive, etc., it is possible, as required, to incorporate into it a binder such as casein, glue, cellulose ether, polyvinyl alcohol, a latex, or an emulsion, a filler such as calcium carbonate or silica, a crosslinking agent, a pigment, etc.

The following Examples and Comparative Examples further illustrate the present invention.

The dispersion stability of the aqueous dispersions obtained in these examples was evaluated by the following method.

The aqueous dispersion (100 cc) was stored for 6 months in a beaker. Then a 20 cc portion was sampled successively from the top of the aqueous dispersion, and thus, five fractions A, B, C, D and E from the top to the bottom of the dispersion in this order were collected. The polymer solids concentration of each fraction was measured. It was judged that a sample in which the polymer solids concentrations of the five fractions vary greatly from each other had bad stability, and a sample in which the polymer solid concentrations of the five fractions vary slightly from each other had good stability.

EXAMPLE 1

The following components (A-1) and (B-1) were melt-blended in a weight ratio of 40:60 to obtain a mixture [average content of a methacrylic acid unit 12.6% by weight, the degree of neutralization 44.6%, melt index 6.4] which contained 0.3% by weight of a copolymer fraction having a methacrylic acid content of less than 5% by weight and 3% by weight of a copolymer fraction having a methacrylic acid content of more than 20% by weight.

Component (A-1): A sodium salt of an ethylene/methacrylic acid copolymer having an average methacrylic acid unit content of 15% by weight, a neutralization degree of 59% and a melt index of 0.9.

Component (B-1): A sodium salt of an ethylene/methacrylic acid copolymer having an average methacrylic acid unit content of 11% by weight, a neutralization degree of 35% and a melt index of 10.

A homomixer kept at 170° C. and having an available volume of 18 liters was charged with the resulting molten mixture of components (A-1) and (B-1) at a rate of 4 kg/hr and water at a rate of 18 liters/hr, and with vigorous stirring, an aqueous dispersion was prepared. In the meanwhile, the aqueous dispersion was continuously withdrawn from the mixer so as to maintain the liquid level constant. There was obtained a stable aqueous dispersion having a viscosity of 3,000 centipoises, a polymer concentration of 35%, and an average polymer particle size of 0.5 micron.

The aqueous dispersion was coated on an aluminum foil (20 micron thick) manually using a bar coater (No. 006), and baked at 170° C. for 20 seconds. The resulting coated film had a thickness of 5 microns and a gloss value (ASTM D 523-62T) of 110 showing good smoothness. When the coated aluminum foil was stored for 7 days in a receptacle kept at a temperature of 30° C. and a relative humidity of 95%, the coated film absorbed 2% by weight of water.

EXAMPLE 2

The same component (A-1) used in Example 1 and the following component (B-2) were melt-blended in a weight ratio of 54:46 to form a mixture [the average content of methacrylic acid units 12.7% by weight, the degree of neutralization 55.8%, melt index 1.04] which contained 0.5% by weight of a copolymer fraction having a methacrylic acid content of less than 5% by weight and 4.1% by weight of a copolymer fraction having a methacrylic acid content of more than 20% by weight Component (B-2): A sodium salt of an ethylene/methacrylic acid copolymer having an average methacrylic acid unit content of 10% by weight, a neutralization degree of 52%, and a melt index of 1.2.

By the same operation as in Example 1, an aqueous dispersion having a viscosity of 900 centipoises, a polymer solids concentration of 35% by weight and an average polymer particle diameter of 0.4 micron was prepared from the resulting mixture.

The gloss value of a coated film prepared from the aqueous dispersion in the same way as in Example 1 was 120, showing good smoothness. The water absorption of the coated film was 2.9%.

EXAMPLE 3

The following component (A-2) and the same component (B-2) as used in Example 2 were mixed in a weight ratio of 54:46.

Component (A-2): An ethylene/methacrylic acid copolymer having an average methacryic acid unit content of 15% by weight and a melt index of 60.

The mixture had an average methacrylic acid unit content of 12.7% by weight, a neutralization degree of 55.7% and a melt index of 1.04.

The same procedure as in Example 1 was repeated except that the resulting mixture was fed at a rate of 4 kg/hr and a 0.82% aqueous solution of sodium hydroxide, at a rate of 18 liters/hr. There was obtained an aqueous dispersion having a viscosity of 400 centipoises, a polymer solids concentration of 35% and an average polymer particle diameter of 0.6 micron.

A coated film prepared from the aqueous dispersion in the same manner as in Example 1 had a gloss value of 100 showing good smoothness. The coated film had a water absorption of 2.9% by weight.

EXAMPLE 4

The same component (A-1) as used in Example 1 and the following component (B-3) were melt-blended in a weight ratio of 70:30 to afford a mixture [the average content of methacrylic acid units 12.45% by weight, the degree of neutralization 50.3%, melt index 2.13] which contained 3.7% by weight of a copolymer fraction having a methacrylic acid content of less than 5% by weight and 3.4% by weight of a copolymer fraction having a methacrylic acid content of more than 20% by weight.

Component (B-3): A sodium salt of an ethylene methacrylic acid copolymer having an average methacrylic acid content of 6.5% by weight, a neutralization degree of 30% and a melt index of 5.

By the same procedure as in Example 1, an aqueous dispersion having a viscosity of 980 centipoises, a polymer solids concentration of 35% by weight and an average polymer particle diameter of 0.85 micron was prepared from the resulting mixture.

A coated film was formed from the aqueous dispersion in the same way as in Example 1. It had a gloss value of 80 showing good smoothness, and a water absorption of 1.4% by weight.

EXAMPLE 5

The following component (A-3) and the same component (B-1) as used in Example 1 were melt blended in a weight ratio of 30:70 to afford a mixture [the average content of a methacrylic acid unit 13.46% by weight, the degree of neutralization 39.5%, melt index 7.24] which contained 0.5% by weight of a copolymer fraction having a methacrylic acid content of less than 5% by weight and 7.5% by weight of a copolymer fraction having a methacrylic acid content of more than 20% by weight.

Component (A-3): A sodium salt of an ethylene/methacrylic acid copolymer having an average methacrylic acid unit content of 19.2% by weight, a neutralization degree of 50% and a melt index of 0.8.

By the same operation as in Example 1, an aqueous dispersion having a viscosity of 1,800 centipoises, a polymer solids concentration of 35% by weight and an average polymer particle diameter of 0.68 micron was prepared from the resulting mixture.

A coated film prepared from the aqueous dispersion had a gloss value of 105 showing good smoothness and a water absorption of 3% by weight.

COMPARATIVE EXAMPLE 1

Example 1 was repeated except that only component (A-1) was fed into the homomixer at a rate of 4 kg/hr instead of components (A-1) and (B-1). There was obtained an aqueous dispersion having a viscosity of more than 50,000 centipoises and a solids concentration of 35% by weight.

COMPARATIVE EXAMPLE 2

When in Comparative Example 1, the same components (B-1) as in Example 1 was used instead of component (A-1), an aqueous dispersion containing irregularly-shaped polymer particles of about 50 microns in diameter was obtained. The dispersion had very low stability.

COMPARATIVE EXAMPLE 3

When in Comparative Example 1, the same component (B-2) as in Example 2 was used instead of component (A-1), an aqueous dispersion containing irregularly-shaped polymer particles of about 50 microns in size was obtained. It had very low stability.

COMPARATIVE EXAMPLE 4

Example 3 was repeated except that component (A-2) alone was fed into the homomixer at a rate of 4 kg/hr instead of components (A-2) and (B-2), and the concentration of sodium hydroxide was varied to provide the degrees of neutralization shown in Table 1.

TABLE 1

| Degree of neutralization (%) | 41 | 42.5 | 45 | 50 | 53.5 | 59 |
|---|---|---|---|---|---|---|
| Viscosities (centipoises) | above 50,000 | above 50,000 | above 100,000 | above 50,000 | above 50,000 | above 50,000 |

TABLE 1-continued

| Degree of neutralization (%) | 41 | 42.5 | 45 | 50 | 53.5 | 59 |
|---|---|---|---|---|---|---|
| at various degrees of neutralization | | | | | | |

*Polymer solids concentration = 35 wt %

COMPARATIVE EXAMPLE 5

The same components (A-1) and (B-3) as used in Example 4 were blended in a weight ratio of 60:40 to afford a mixture (the average content of a methacrylic acid unit 11.6% by weight, the degree of neutralization 47.4%, melt index 2.54) which contained 6% by weight of a copolymer fraction having a methacrylic acid content of less than 5% by weight and 3.5% by weight of a copolymer fraction having a methacrylic acid content of more than 20% by weight.

An aqueous dispersion having a viscosity of 1,000 centipoises, a polymer solids concentration of 35% by weight and an average polymer particle diameter of 1.50 microns was obtained from the mixture.

A coated film prepared from the aqueous dispersion had a gloss value of as low as 20.1, and its coated surface was markedly uneven.

COMPARATIVE EXAMPLE 6

When an aqueous dispersion was prepared by using the same component (B-3) as used in Example 4, it contained irregularly-shaped polymer particles with a particle diameter of more than 50 microns, and the stability of the dispersion was very low.

COMPARATIVE EXAMPLE 7

The same components (A-3) and (B-1) as used in Example 5 were blended in a weight ratio of 60:40 to afford a mixture [the average content of a methacrylic acid unit 15.92% by weight, the degree of neutralization 44%, melt index 4.48] which contained 0.3% by weight of a copolymer fraction having a methacrylic acid content of less than 5% by weight and 15% by weight of a copolymer fraction having a methacrylic acid content of more than 20% by weight.

By operating in the same way as in Example 5, an aqueous dispersion having a viscosity of 2,000 centipoises, a polymer solid concentration of 35% by weight and an average polymer particle diameter of 0.3 micron was prepared from the resulting mixture.

A coated film prepared from the aqueous dispersion in the same way as in Example 1 had a gloss value of 140 showing good smoothness, but a water absorption of as high as 5.2% by weight.

COMPARATIVE EXAMPLE 8

When Example 5 was repeated using only the component (A-3) as a polymer, an aqueous dispersion was obtained which had a solids concentration of 35% by weight and a viscosity of more than 100,000 centipoises.

The dispersion stabilities of the aqueous dispersions obtained in the Examples and the Comparative Examples are shown in Table 2.

TABLE 2

|  | Fraction A | Fraction B | Fraction C | Fraction D | Fraction E |
|---|---|---|---|---|---|
| Example 1 | 35.2 | 35.1 | 34.9 | 35.0 | 34.9 |
| Example 2 | 34.9 | 34.8 | 35.1 | 35.1 | 35.0 |
| Example 3 | 35.3 | 35.2 | 35.2 | 34.9 | 35.1 |
| Example 4 | 35.0 | 35.0 | 34.9 | 35.1 | 34.8 |
| Example 5 | 35.1 | 34.9 | 34.9 | 35.1 | 34.8 |
| Comparative Example 5 | 36.0 | 35.5 | 35.0 | 34.1 | 33.6 |
| Comparative Example 7 | 34.9 | 35.0 | 35.0 | 35.1 | 34.9 |

*Unit: % by weight

What we claim is:
1. An aqueous dispersion of improved stability, said dispersion consisting essentially of a mixture of
   (A) 30 to 50% by weight of an ethylene/$\alpha,\beta$-unsaturated carboxylic acid copolymer containing 12 to 20% by weight on an average of $\alpha,\beta$-unsaturated carboxylic acid units or the metal salt there of, and
   (B) 70 to 50% by weight of an ethylene/$\alpha,\beta$-unsaturated carboxylic acid copolymer containing 5 to 12% by weight on an average of $\alpha,\beta$-unsaturated carboxylic acid units or the metal salt there of, both components (A) and (B) having a melt index of from 0.5 to 100, said mixture containing 8 to 20% by weight on an average, based on the weight of the mixture of the $\alpha,\beta$-unsaturated carboxylic acid units, 40 to 80% of which units are present in the form of metal salts, and said mixture not containing more than 5% by weight, based on the weight of the mixture, of a fraction of the ethylene/$\alpha,\beta$-unsaturated carboxylic acid having an $\alpha,\beta$-unsaturated carboxylic acid unit content of less than 5% by weight or its salt, and more than 10% by weight, based on the weight of the mixture, of a fraction of the ethylene/$\alpha,\beta$-unsaturated carboxylic acid having an $\alpha,\beta$-unsaturated carboxylic acid unit content of more than 20% by weight or its salt, the $\alpha,\beta$-unsaturated carboxylic acid being selected from the group consisting of acrylic acid, methacrylic acid, $\alpha$-ethylacrylic acid, maleic acid, fumaric acid, and itaconic acid and the metal salt being selected from the group consisting of an alkali metal salt, an alkaline earth metal salt and a zinc salt.

* * * * *